(12) United States Patent
Tulloch et al.

(10) Patent No.: US 11,161,618 B2
(45) Date of Patent: Nov. 2, 2021

(54) JOINT FOR CONNECTING AIRCRAFT STRUCTURES

(71) Applicants: AIRBUS OPERATIONS LIMITED, Bristol (GB); AIRBUS OPERATIONS (S.A.S.), Toulouse (FR)

(72) Inventors: William Tulloch, Bristol (GB); Pat Broomfield, Bristol (GB); Olivier Pautis, Bristol (GB)

(73) Assignees: Airbus Operations Limited, Bristol (GB); Airbus Operations (SAS), Toulouse (FR)

( * ) Notice: Subject to any disclaimer, the term of this patent is extended or adjusted under 35 U.S.C. 154(b) by 0 days.

(21) Appl. No.: 16/583,978

(22) Filed: Sep. 26, 2019

(65) Prior Publication Data
US 2020/0102081 A1   Apr. 2, 2020

(30) Foreign Application Priority Data

Sep. 28, 2018 (GB) ...................................... 1815828
Apr. 18, 2019 (GB) ...................................... 1905517

(51) Int. Cl.
*F16M 13/00* (2006.01)
*B64D 27/26* (2006.01)

(52) U.S. Cl.
CPC ........ *B64D 27/26* (2013.01); *B64D 2027/264* (2013.01)

(58) Field of Classification Search
CPC .... B64D 27/26; B64D 2027/264; B64C 3/28; B64C 2/187; B64F 5/10; F16C 11/0614
See application file for complete search history.

(56) References Cited

U.S. PATENT DOCUMENTS

2011/0023283 A1   2/2011   Blachon
2013/0233997 A1   9/2013   Suciu et al.
(Continued)

FOREIGN PATENT DOCUMENTS

EP    2 841 339    3/2015
FR    3 047 726    8/2017
(Continued)

OTHER PUBLICATIONS

European Search Report cited in EP 19196527.6 dated Jan. 27, 2020, 13 pages.
(Continued)

*Primary Examiner* — Amy J. Sterling
(74) *Attorney, Agent, or Firm* — Nixon & Vanderhye P.C.

(57) ABSTRACT

A joint for connecting a first aircraft structure to a second aircraft structure such that relative rotation and relative translational movement of the first and second aircraft structures along a first axis is permitted, whilst relative translational movement of the first and second aircraft structures along axes orthogonal to the first axis is substantially prevented. The joint includes a bracket having an opening aligned with the first axis; a pin aligned with the first axis and extending through the opening; and a bearing mounted in the opening. The bearing has an inner bearing surface defining a bore through which the pin extends, which is configured for translational sliding contact with the pin, and a part-spherical outer bearing surface configured for rotational sliding contact with the opening.

18 Claims, 4 Drawing Sheets

(56) References Cited

U.S. PATENT DOCUMENTS

2018/0073545 A1    3/2018  Buchanan et al.
2019/0002079 A1*   1/2019  Schlipf .................. B64C 3/185
2020/0140059 A1*   5/2020  Bishop ..................... B64C 3/28

FOREIGN PATENT DOCUMENTS

| GB | 2 058 239   | 4/1981 |
| GB | 2 293 205   | 3/1996 |
| SU | 1 099 538   | 10/1996 |
| WO | 2008/014509 | 1/2008 |
| WO | 2013/162666 | 10/2013 |
| WO | 2018/192787 | 10/2018 |

OTHER PUBLICATIONS

Combined Search & Examination Report for GB1815828.7, dated Mar. 27, 2019, 7 pages.

* cited by examiner

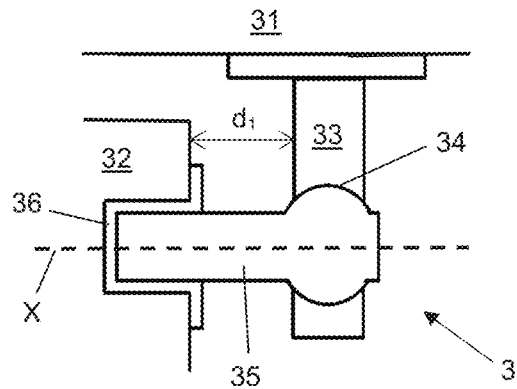
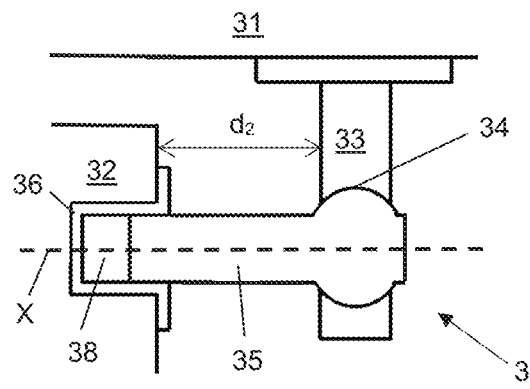
Fig. 3a        Fig. 3b
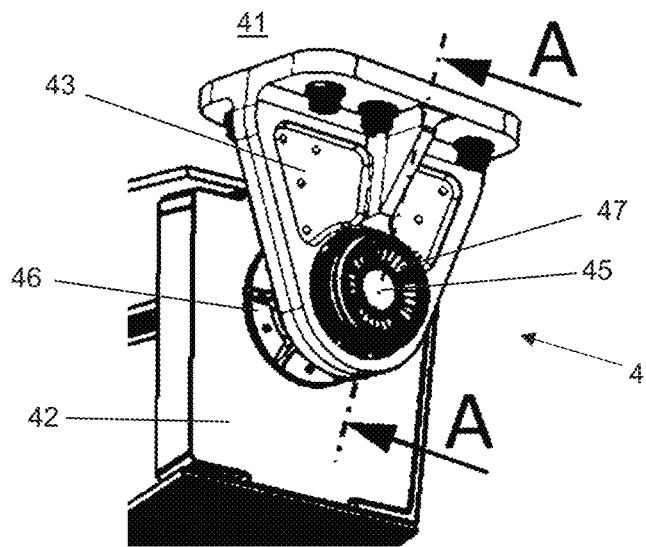
Fig. 4a

JOINT FOR CONNECTING AIRCRAFT STRUCTURES

RELATED APPLICATIONS

This application claims priority United Kingdom Patent Applications GB 1815828.7, filed Sep. 28, 2018, and to GB 1905517.7, filed Apr. 18, 2019, both of which are incorporated by reference in their entireties.

TECHNICAL FIELD

The present invention relates to a joint for connecting a first aircraft structure to a second aircraft structure, and to an aircraft comprising such a joint.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

Conventionally, an engine mounting pylon is attached to a wing box by a set of couplings interposed vertically between the wing box and the primary structure of the pylon, which generally constitute a statically determined interface, or one with a low level of hyperstaticity. These couplings transmit forces between the engine mounting pylon and the wing box, including the thrust loads generated by the engine, and at the same time allow a certain freedom of movement between both components (due to the loading and rigidity of the pylon and wing box). Known designs of such couplings require the top surface of the engine mounting pylon to be spaced apart vertically from the lower surface of the wing box, and are therefore not suitable for use with very large diameter engines.

SUMMARY

A first aspect of the present invention provides a joint for connecting a first aircraft structure to a second aircraft structure such that relative rotation and relative translational movement of the first and second aircraft structures along a first axis is permitted, whilst relative translational movement of the first and second aircraft structures along axes orthogonal to the first axis is substantially prevented. The joint comprises a bracket on the first aircraft structure; a pin aligned with the first axis; and a convex part-spherical outer bearing surface. The bracket has an opening aligned with the first axis, and a first end of the pin is received within the opening. A second end of the pin is engaged with the second aircraft structure. The convex part-spherical outer bearing surface is disposed on the first end of the pin and is configured for rotational sliding contact with a concave part-spherical bearing surface disposed in the opening. The pin is configured to translate along the first axis relative to the part-spherical outer bearing surface and/or relative to the second aircraft structure.

Optionally, the first axis is substantially aligned with an intended direction of travel of an aircraft in which the joint is comprised.

Optionally, the primary load reacted by the joint during operation of an aircraft in which the joint is comprised acts along a direction substantially perpendicular to the first axis.

Optionally, the primary load reacted by the joint during operation of an aircraft in which the joint is comprised acts along the vertical direction.

Optionally, the axis of the bore is aligned with the first axis.

Optionally, the pin comprises a secondary pin element nested within a primary pin element. Each of the primary pin element and the secondary pin element is individually able to react the loads expected to be experienced by the pin during operation of an aircraft in which the joint is comprised.

Optionally, engagement between the convex part-spherical outer bearing surface and the concave part-spherical bearing surface substantially prevents translational movement of the convex part-spherical outer bearing surface relative to the concave part-spherical bearing surface.

Optionally, the second end of the pin is engaged with the second aircraft structure by means of the second end of the pin being received in a recess provided in an outer surface of the second aircraft structure.

Optionally, the second end of the pin is configured for axial sliding movement relative to the recess.

Optionally, the convex part-spherical outer bearing surface is comprised in a bearing mounted in the opening. Optionally, the bearing further comprises an inner bearing surface defining a bore through which the pin extends and being configured for translational sliding contact with the pin.

Optionally, the joint comprises a biasing mechanism configured to bias the pin toward a predefined axial position relative to the bracket. Optionally, the biasing mechanism comprises a diaphragm spring mounted on the bracket.

Optionally, the convex part-spherical outer bearing surface is fixedly attached to the first end of the pin, such that translation of the pin along the first axis relative to the first aircraft structure is substantially prevented.

Optionally, the first aircraft structure is an engine mounting pylon and the second structure is a wing box, and the joint is configured to connect an aft end of the engine mounting pylon to the wing box.

A second aspect of the present invention provides an aircraft comprising a first aircraft structure connected to a second aircraft structure by a joint according to the first aspect.

Optionally, the first aircraft structure is an engine mounting pylon and the second aircraft structure is a wing box. Optionally, the engine mounting pylon and the wing box are close-coupled. Optionally, the aircraft further comprises an Ultra High-Bypass Ratio engine mounted on the engine mounting pylon.

BRIEF DESCRIPTION OF THE DRAWINGS

Embodiments of the invention will now be described, by way of example only, with reference to the accompanying drawings, in which:

FIGS. 3a and 3b are schematic cross-sections through a third example joint according to the invention, in first and second shifted configurations;

FIG. 4a is a perspective view of a fourth example joint according to the invention;

DETAILED DESCRIPTION

Figure 1:
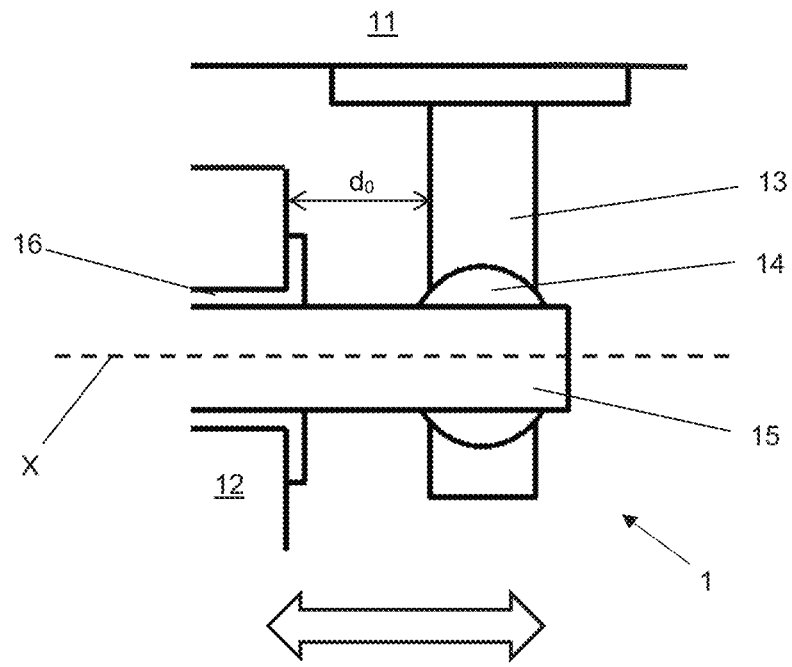
FIG. 1 is a schematic cross-section through a first example joint according to the invention, in a nominal configuration.

The examples described below each relate to a joint for connecting a first aircraft structure to a second aircraft structure such that relative rotation and relative translational movement of the first and second aircraft structures along a first axis is permitted, whilst relative translational movement of the first and second aircraft structures along axes orthogonal to the first axis is substantially prevented. Each example joint according to the invention comprises a bracket on the first aircraft structure, the bracket having an opening aligned with the first axis; a pin aligned with the first axis, a first end of the pin being received within the opening and a second end of the pin being engaged with the second aircraft structure; and a convex part-spherical outer bearing surface disposed on the first end of the pin and configured for rotational sliding contact with a concave part-spherical bearing surface disposed in the opening. In each example the pin is configured to translate along the first axis relative to the part-spherical outer bearing surface, and/or is configured to translate along the first axis relative to the second aircraft structure.

Example joints according to the invention are suitable for coupling the aft end of an engine mounting pylon to an aircraft wing box. The aft coupling between an engine mounting pylon and a wing box (also known as an "aft pick-up" (APU)) supports the weight of an entire powerplant system (PPS) of the aircraft (that is, an engine, nacelle and pylon), and therefore mostly reacts vertical loads. However; the aft coupling must also be able to accommodate changes in the relative position and orientation of the pylon and the wing box during flight, for example due to lateral bending of the pylon caused by lateral wind gusts hitting the centre of gravity of the PPS. Such bending of the pylon transfers loads to the wing. PCT/EP2018/058960 discloses example assemblies each comprising an aircraft wing and an engine mounting pylon fixed under the wing. PCT/EP2018/058960 proposes a front wing attachment mechanism that is suitable for achieving a close coupling between the pylon and the wing box, but the disclosed rear wing attachment mechanism uses a conventional triangular shackle arrangement. It is not possible to achieve a very close coupling using such a shackle arrangement.

The example joints according to the invention can perform the functions of reacting vertical loads whilst accommodating changes in the relative position and orientation of the pylon and the wing box whilst also being very compact in the vertical direction. The example joints according to the invention may significantly reduce the vertical distance between the top surface of the pylon and the lower surface of the wing box as compared to the rear wing attachment mechanism disclosed in PCT/EP2018/058960. The example joints may thereby enable a very close coupling between the engine mounting pylon and the wing box. Furthermore, the design of the example joints permits them to be installed from outside the pylon and the wing box, meaning that both of these components can be fully closed before they are coupled together. This feature may significantly simplify construction of the aircraft.

FIG. 1 is a cross-section through an example joint 1 according to the invention. FIG. 1 shows the joint 1 in a nominal configuration representing the situation where neither of the aircraft structures 11, 12 connected by the joint 1 are experiencing any forces causing them to be shifted from their default relative position. In the nominal configuration a distance d between a bracket 13 on the first aircraft structure 11 and the second aircraft structure 12 has a nominal value do. During operation of the joint 1, the first and second aircraft structures 11, 12 may move such that the distance d becomes larger or smaller than do, as will be explained below.

The example joint 1 connects the first aircraft structure 11 to the second aircraft structure 12 such that some degree of relative rotation of the first and second aircraft structures 11, 12, is permitted, about any axis. Relative translational movement of the first and second aircraft structures 11, 12 along a first axis X is also permitted, as indicated by the block arrow. However; relative translational movement of the first and second aircraft structures 11, 12 along axes orthogonal to the first axis is substantially prevented by the construction of the joint 1. The first axis X is fixed relative to the second aircraft structure 12, but is not fixed relative to the first aircraft structure 11. The first axis X may be generally aligned with a direction of travel of an aircraft in which the joint 1 is comprised, although it need not be exactly parallel to the direction of travel at all times during operation of the aircraft, as will be further explained below.

The joint 1 comprises a bracket 13, which has an opening aligned with the first axis X. The bracket 13 is fixedly attached to the first structure 11 by any suitable mechanism (e.g. fasteners). The particular configuration and material of the bracket may be selected in dependence on the particular application. The opening is in the form of a bore extending through the bracket 13. The axis of the bore is parallel to the first axis X. The walls of the bore are not straight, but are instead curved to match the shape of a convex part-spherical outer bearing surface that is disposed on a pin 15, which is also comprised in the joint 1. That is, the walls of the bore are concave part-spherical, with substantially the same curvature as the outer bearing surface.

The pin 15 is mounted on the second aircraft structure 12 by any suitable mechanism. The pin 15 has a first end (which in this example is a rearward end) which is received within the opening, and a second end (which in this example is a forward end) which is engaged with the second aircraft structure 12. In some examples the second end of the pin 15 is received in a recess formed in an outer surface of the second aircraft structure 12. In other examples the second end of the pin 15 may be received in an opening comprised in a part of the second aircraft structure 12. In the illustrated example, the second end of the pin 15 is received within a recess which comprises a socket 16. In some examples the depth of the socket 16 is large enough that a gap exists between the base of the socket (not visible in FIG. 1) and the second end of the pin 15 when the joint 1 is in the nominal configuration as shown in FIG. 1. This permits the pin 15 to move forwardly along the axis X, relative to the second aircraft structure 11. In other examples the position of the pin 15 is fixed relative to the second aircraft structure 11, in which case the second end of the pin 15 may contact the base of the socket 16 in the nominal configuration (and all other possible operational configurations of the joint 1).

The socket 16 may be configured to withstand the loads and relative movements expected to be experienced by the socket 16 during operation of the aircraft without incurring an undue amount of wear. The pin 15 is aligned with the first axis X (that is, the long axis of the pin 15 is parallel to the first axis X). In some examples the pin 15 may be free to move axially and/or rotationally relative to the second aircraft structure 12. In other examples the pin 15 is fixed axially and/or rotationally relative to the second aircraft structure 12. The pin 15 extends through the opening in the bracket 13.

As mentioned above, a convex part-spherical outer bearing surface is disposed on the first end of the pin 15. In some examples, this outer bearing surface is fixedly attached to the first end of the pin 15. For example, the convex part-spherical outer bearing surface may be formed by a circumferential protrusion extending from the outer surface of the pin 15. Such a protrusion may be formed integrally with the pin 15, or may be fixedly attached to the pin 15 in any suitable manner.

In some examples (including the particular example shown in FIG. 1) the convex part-spherical outer bearing surface is comprised in a bearing 14 which is mounted in the opening. The outer bearing surface is configured for rotational sliding contact with the opening in the bracket 13. By virtue of the part-spherical shape of the outer bearing surface, the bearing 14 may rotate about any axis relative to the bracket 13. The bearing 14 is prevented (by its mounting) from moving translationally with respect to the bracket 13 along any axis, thereby preventing any relative translational movement of the first and second aircraft structures 11, 12 in directions orthogonal to the first axis X.

In some examples in which the joint 1 comprises a bearing 14, the pin 15 extends through a bore in the bearing 14. In such examples, the bearing 14 has an inner bearing surface which defines the bore through which the pin 15 extends, in addition to the part spherical outer bearing surface. The inner bearing surface is configured for translational sliding contact with the pin 15, such that the pin is able to translate along the first axis relative to the part-spherical outer bearing surface. The bore defined by the inner bearing surface is coaxial with the pin 15, and has substantially the same diameter as the pin 15. The close fit of the pin within the bearing bore prevents all relative movement of the pin 15 and the bearing 14 except for axial translation. In a nominal orientation of the bearing 14, the axis of the bore defined by the inner bearing surface is parallel to the first axis X The particular configuration and material of the pin 15 may be selected in dependence on the particular application.

In some examples in which the pin is configured to translate along the first axis relative to the part-spherical outer bearing surface, the joint 1 further comprises a biasing mechanism (not shown) configured to bias the pin 15 toward a predefined axial position relative to the bracket 13. For example, the biasing mechanism may bias the pin towards the second aircraft structure 12. The predefined axial position may be a position in which the pin is shifted forward compared to the nominal position shown in FIG. 1.

During operation of the aircraft in which the first and second aircraft structures 11, 12 are comprised, it may be desirable to allow the first and second aircraft structures to undergo a certain amount of relative movement linked to their deformation under loading, e.g. to avoid loading the joint 1 unnecessarily. In examples where the first aircraft structure 11 is a wing box and the second aircraft structure 12 is an engine mounting pylon, the pylon may be expected to experience some axial bending during flight. The separation of the aft end of the pylon from the bracket 13 along the X axis, as well as the angle between the aft end of the pylon and the bracket 13, will be altered as a result of such bending. The change in the separation is accommodated by the pin 15 sliding axially within the bearing 14 (in examples in which the pin is configured to translate along the first axis relative to the part-spherical outer bearing surface) and/or by the pin 15 sliding axially within the socket 16 (in examples in which the pin is configured to translate along the first axis relative to the second aircraft structure). The angular change is accommodated by the convex part-spherical outer bearing surface rotating relative to the bracket 13.

Figures 2A, 2B:
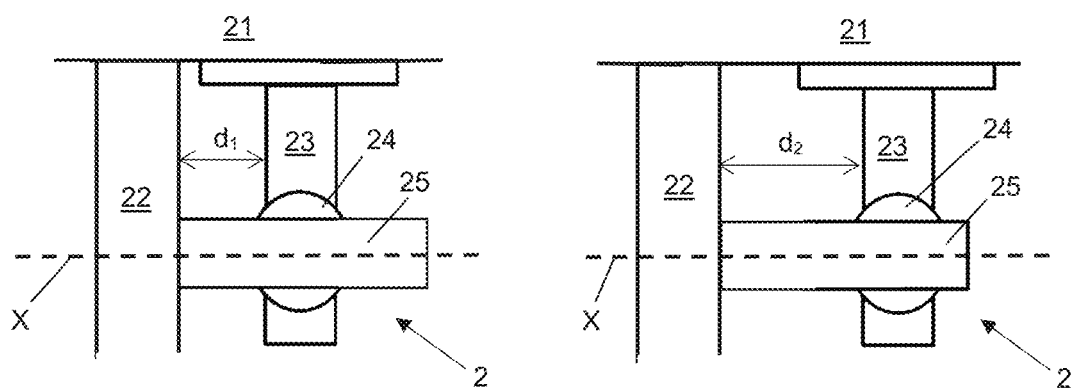
FIGS. 2a and 2b are schematic cross-sections through a second example joint according to the invention, in first and second shifted configurations.

FIGS. 2a and 2b show an example joint 2 according to the invention, for connecting a first aircraft structure 21 to a second aircraft structure 22, in which a pin 25 of the joint 2 is configured to translate along an axis X relative to a convex part-spherical outer bearing surface disposed on the pin 25. In this example the convex part-spherical outer bearing surface is comprised in a bearing 24 mounted in an opening in a bracket 23, which is fixedly attached to the first aircraft structure. The bearing 24 further comprises an inner bearing surface in the form of a bore aligned with the axis X (at least in a nominal orientation of the bearing 24 as shown in FIGS. 2a and 2b). A rearward end of the pin 25 extends through the bore in the bearing 24. The inner bearing surface of the bearing 24 is configured for sliding contact with the surface of the pin 25, such that the pin 25 is free to move translationally relative to the bearing 24. The components of the example joint 2 may have any of the features of corresponding components of the example joint 1 described above.

In the illustrated example, the forward end of the pin 25 is fixedly attached to the second aircraft structure 22 by any suitable mechanism, such that relative movement of the pin 25 and second aircraft structure 22 is prevented. However; other examples are possible in which the forward end of the pin 25 is configured to translate relative to the second aircraft structure 22. For example, the forward end of the pin 25 may be received in an opening or recess in the second aircraft structure 22, as is the case for the example joint 1. It can be advantageous to configure a joint according to the invention such that the pin is able to translate along the axis X relative to both the convex part-spherical outer bearing surface (and thus relative to the first aircraft structure) and relative to the second aircraft structure, since the risk of both of the sliding connections seizing is very low. The joint would still function if only one of the sliding connections seized up. In some examples in which the pin 25 is configured to translate relative to both the convex part-spherical outer bearing surface and relative to the second aircraft structure 22, the joint 2 may additionally comprise a biasing mechanism configured to bias the pin toward a predefined axial position relative to the bracket 23. The operation of such a biasing mechanism will be explained in more detail below, with reference to FIGS. 4a and 4b.

FIG. 2a shows the joint 2 in a first operational configuration in which a separation d between the aft end of the second aircraft structure 22 and the bracket 23 has a first value $d_1$, which is smaller than the value of d in a nominal configuration of the joint 2. FIG. 2b shows the joint 2 in a second operational configuration in which the separation between the aft end of the second aircraft structure 22 and the bracket 23 has a second value $d_2$, which is greater than the value of d in the nominal configuration of the joint 2. Either or both of the first operational configuration and the second operational configuration may be experienced by the joint 2 during operation of the joint 2. Moreover; any intermediate configuration in which the value of d is between $d_1$ and $d_2$ may be experienced by the joint 2 during operation.

FIGS. 3a and 3b 2a and 2b show an example joint 3 according to the invention, for connecting a first aircraft structure 31 to a second aircraft structure 32, in which a pin 35 of the joint 3 is configured to translate along an axis X relative to a the second aircraft structure 32. In this example the convex part-spherical outer bearing surface is comprised in a circumferential protrusion 34, which is formed integrally with the pin 35 at a rearward end of the pin 35. The circumferential protrusion 34 is received within an opening formed in the bracket 33, which is aligned with the axis X. The pin 35 is prevented from translating relative to the bracket 33 by virtue of the engagement between the convex part-spherical outer bearing surface of the protrusion 34 and the inner surface of the opening, which is concave part-spherical and has substantially the same curvature as the outer bearing surface of the protrusion 34.

A forward end of the pin 35 is received within a recess provided in an aft-facing surface of the second aircraft structure 32. The depth of the recess is at least as large as the maximum amount of movement along the axis X of the pin 35 relative to the second aircraft structure 32 that is expected to occur during operation of the joint 3. The inner surface of the recess comprises a bearing surface, and is configured to facilitate relative movement of the pin 35 and the recess. For example, the inner surface of the recess may comprise a material which is low-friction and wear-resistant. In the illustrated example, the recess is lined by a socket 36, which is formed from a different material to the second aircraft structure 32. The components of the example joint 3 may have any of the features of corresponding components of the example joint 1 described above.

FIG. 3a shows the joint 3 in a first operational configuration in which a separation d between the aft end of the second aircraft structure 32 and the bracket 33 has a first value $d_1$, which is smaller than the value of d in a nominal configuration of the joint 3. The first operational configuration represents a smallest possible value for d, as in this configuration the forward end of the pin 35 abuts the base of the recess. FIG. 3b shows the joint 3 in a second operational configuration in which the separation between the aft end of the second aircraft structure 32 and the bracket 33 has a second value $d_2$, which is greater than the value of d in the nominal configuration of the joint 3. In the second operational configuration, a gap 38 exists between the forward end of the pin 35 and the base of the recess. Either or both of the first operational configuration and the second operational configuration may be experienced by the joint 3 during operation of the joint 3. Moreover; any intermediate configuration in which the value of d is between $d_1$ and $d_2$ may be experienced by the joint 3 during operation.

Figure 4B:
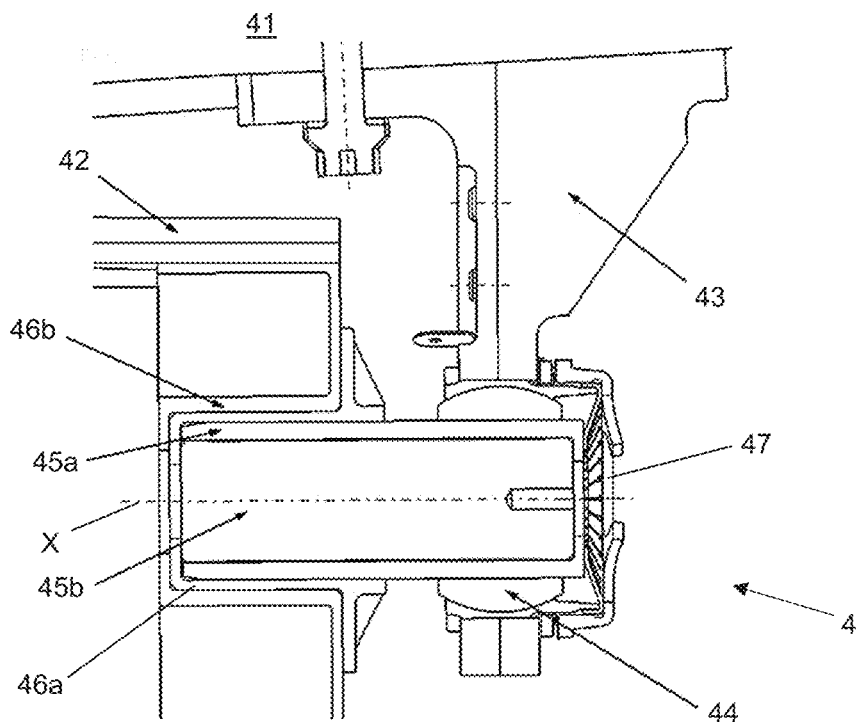
FIG. 4b is a cross-section through the example joint of FIG. 4a, along the line A-A.

FIGS. 4a and 4b show a particular example joint 4 according to the invention, connecting a first aircraft structure in the form of a wing box 41 to a second aircraft structure in the form of the aft end of an engine mounting pylon 42. The joint 4 comprises a bracket 43, a bearing 44 and a pin 45 which have the same general features as the corresponding components of the example joint 1 described above. A first axis X is defined for the joint 4, which has the same features as the first axes of the example joints 1, 2, and 3 described above. The joint 4 also comprises various specific features which make it particularly suitable for use as an engine mounting pylon APU, as will now be described.

The pin 45 is mounted on the aft end of the engine mounting pylon 42 by means of the forward end of the pin 45 being received in a recess (or socket) 46 provided on the rear surface of the pylon 42. The pin 45 is free to move axially and rotationally with respect to the socket 46. An advantage of this mounting arrangement is that no access to the interior of the pylon structure is required in order to mount the pin 45 on the pylon 42, so the mounting of the pin 45 can be done at the stage of joining the pylon to the wing during final assembly of the aircraft, after the pylon structure has been fully closed and equipped with systems.

Axial movement of the pin 45 is constrained by a biasing mechanism 47 which acts to bias the pin 45 into engagement with the socket 46. In the illustrated example, the biasing mechanism comprises a diaphragm spring mounted on the bracket 43 such that it exerts an axial biasing force on the aft end of the pin 45. In other examples, a different type of spring or elastic component could be used as the biasing mechanism. The biasing mechanism 47 allows axial displacement of the pin 45 within the bore 44, linked to relative displacement of the wing box 41 and pylon 42, whilst ensuring that the pin 45 stays embedded in the socket 46. The joint 4 is thereby made more robust because relative movement of the pin 45 and the socket 46 is minimised or prevented, which avoids or minimises the risk of abnormal wear of the pin 45 and the socket 46.

The bracket 43, pin 45 and socket 46 are all designed to be fail-safe. In particular, the bracket 43 comprises two fittings joined together in a "back-to-back" arrangement. Each fitting is individually able to react the loads expected to be experienced by the bracket 43 during operation of the aircraft in which the joint 4 is comprised. The pin 45 comprises a secondary pin element 45b nested within a primary pin element 45a. Each of the primary pin element 45a and the secondary pin element 45b is individually able to react the loads expected to be experienced by the pin 45 during operation of the aircraft. Similarly, the socket 46 comprises a primary socket element 46a nested within a secondary socket element 46b. Each of the primary socket element 46a and the secondary socket element 46b is individually able to react the loads expected to be experienced by the socket 46 during operation of the aircraft. Thus, in the event that one or both of the primary pin element 45a and the primary socket element 46a, and/or one of the fittings comprising the bracket 43 fails, the functioning of the joint 4 will remain substantially unaffected.

To attach the aft end of the engine mounting pylon 42 to the wing box 41 by means of the joint 4, the pylon 42 is arranged in the nominal position relative to the wing box 41 (e.g. using jigs). The socket 46 is pre-installed on the pylon 42, and the bracket 43 (including the bearing 44) is pre-installed on the wing box 41. The pin 45 is then inserted through the bore in the bearing 44 and into the socket 46. The diaphragm spring 47 is then fixed to the bracket 43 such that it pushes on the aft end of the pin 45. It will be appreciated that this process does not require access to the inside of either the pylon 42 or the wing box 41.

Figure 5:
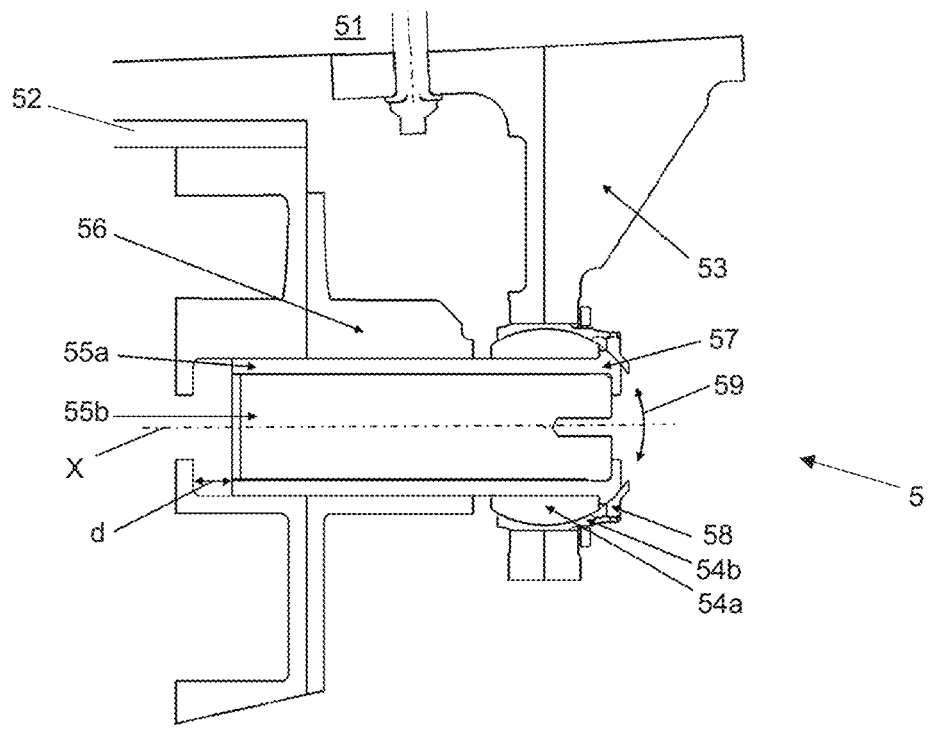
FIG. 5 is a cross-section through a fifth example joint according to the invention.

FIG. 5 shows a further particular example joint 5 according to the invention. Like the example joint 4, the example joint 5 is for connecting a first aircraft structure in the form of a wing box 51 to a second aircraft structure in the form of the aft end of an engine mounting pylon 52. The joint 5 comprises a bracket 53, a bearing 54a, 54b and a pin 55. The components of the joint 5 may be assumed to have the same features as the corresponding components of the joint 4, except where explicitly stated otherwise. The joint 5 comprises various specific features which make it particularly suitable for use as an engine mounting pylon APU, and provides an alternative to the example joint 4. The example joint 5 may be able to handle higher loads than the example joint 4, making it especially suitable for larger aircraft.

The pin 55 is mounted on the aft end of the engine mounting pylon 52 by means of the forward end of the pin 55 being received in a recess provided on the rear surface of the pylon 52. The recess is formed by a combination of a depression in the rear surface of the pylon 52, and a socket 56 provided on the rear surface of the pylon 52 coaxial with the depression. The pin 55 is free to move axially and rotationally with respect to the recess. As with the joint 4, no access to the interior of the pylon structure is required in order to mount the pin 55 on the pylon 52.

The bearing 54a, 54b comprises a convex part-spherical inner bearing element 54a, which provides the convex part-spherical outer bearing surface of the joint 5. The inner bearing element 54a is fixedly attached to the rearward end of the pin 55, such that relative translation along an axis X of the inner bearing element 54a and the pin 55 is prevented. The bearing 54b further comprises an outer bearing element 54b, which is fixedly mounted in an opening in the bracket 53. The outer bearing element 54b has a concave part-spherical inner bearing surface which is configured for rotational sliding contact with the convex part-spherical outer bearing surface of the inner bearing element 54a. The rotational movement of the pin 55 which is facilitated by the bearing 54a, 54b is illustrated by the arrow 59.

The bracket 53, pin 55 and socket 56 are all designed to be fail-safe, in substantially the same manner as the corresponding components of the example joint 4. Like the pin 45, the pin 55 comprises a secondary pin element 55b nested within a primary pin element 55a. However; in the example joint 5 the primary pin element 55a comprises additional features configured to retain the bearing 54a, 54b on the pin 55, and to prevent any axial movement of the bearing 54a, 54b relative to the pin 55.

In particular, the rearward end of the primary pin element 55a comprises a circumferential protrusion 57. A forward surface of the protrusion 57 abuts a rearward surface of the inner bearing element 54a and thereby prevents the inner bearing element 54a from moving rearwardly relative to the pin 55. A rearward surface of the protrusion 57 is part-spherical and has the same curvature as the convex part-spherical outer bearing surface of the inner bearing element 54a. Indeed, the rearward surface of the protrusion forms a continuation of the convex part-spherical outer bearing surface. This ensures that rotational movement of the pin 55 relative to the bracket 53 is not hindered by the protrusion 57. Forward movement of the inner bearing element 54 relative to the pin 55 is prevented by a retention ring nut 58, which is fixedly attached to the outer bearing element 54b and acts to retain the protrusion 57 against the rearward surface of the inner bearing element 54a. The retention ring nut 58 has a part-spherical inner surface which abuts the part-spherical rearward surface of the protrusion 57, to permit relative pivoting of the pin 55 and the retention ring nut 58. The clamping force exerted by the retention ring nut 58 is sufficiently low that relative rotation of the protrusion 57 and the retention ring nut 58 occurs easily.

To attach the aft end of the engine mounting pylon 52 to the wing box 51 by means of the joint 5, the pylon 52 is arranged in the nominal position relative to the wing box 51 (e.g. using jigs). The socket 56 is pre-installed on the pylon 52, and the bracket 53 (including both elements of the bearing 54a, 54b) is pre-installed on the wing box 51. The pin 55 is then inserted through a bore in the inner bearing element 54a and into the socket 56, until the forward surface of the protrusion 57 abuts the rearward surface of the inner bearing element 54a. At this point, a gap of width d exists between the forward end of the pin 55 and the base of the recess in the second aircraft structure 52. The axial position of the pin 55 relative to the bearing 54a, 54b (and therefore relative to the bracket 53 and the first aircraft structure 51) is then fixed by attaching the retention ring nut 58 to the outer bearing element 54b, such that the protrusion 57 is retained between the retention ring nut 58 and the inner bearing element 54a. It will be appreciated that this process does not require access to the inside of either the pylon 52 or the wing box 51.

Figure 6:
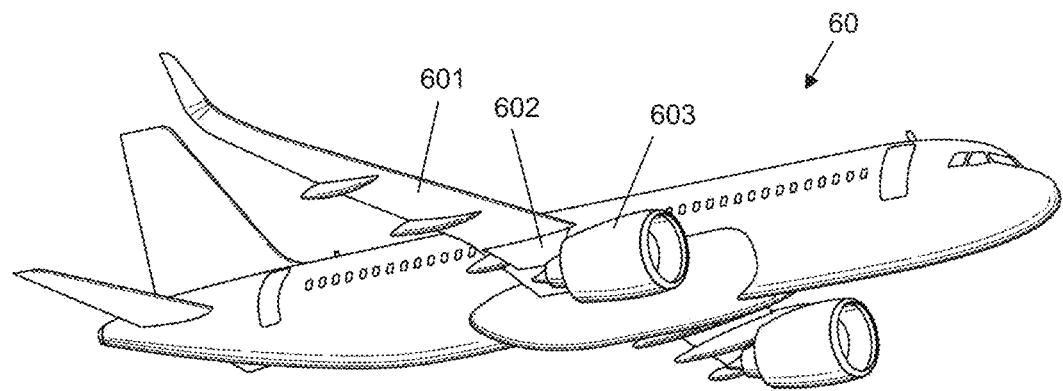
FIG. 6 is a perspective view of an example aircraft comprising an example joint according to the invention.

FIG. 6 shows an example aircraft 60 which comprises one or more joints according to the invention. In particular, the aircraft 60 comprises a wing 601, to which an engine mounting pylon 602 is attached. An Ultra-High-Bypass Ratio (UHBR) engine 603 is mounted on the engine mounting pylon 602. The engine mounting pylon 602 is close-coupled to the wing 601. An aft end of the engine mounting pylon 602 is attached to the wing box of the wing 601 by an example joint according to the invention (e.g. any of the example joints described above). The aircraft 60 also includes a further wing, engine mounting pylon and UHBR engine. The further wing and engine mounting pylon may be connected in the same manner as the wing 601 and pylon 602.

The aircraft 60 may also include one or more further joints according to the invention, which may connect together aircraft structures other than pylons and wings. Indeed, joints according to the invention may be particularly suited to any application where it is desired to form a close coupling between two structures, where it is desired to permit certain types of relative movement between the connected structures.

Figure 7:
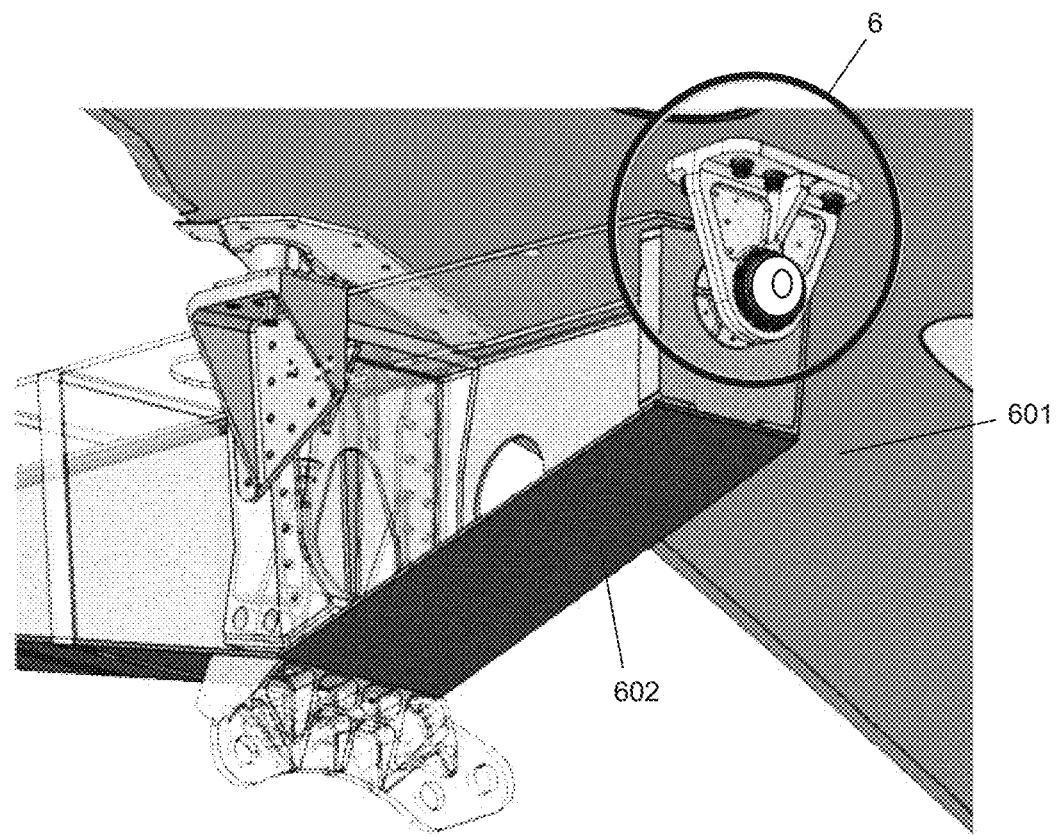
FIG. 7 is a partial perspective view of a wing and an engine mounting pylon of the aircraft of FIG. 6.

FIG. 7 shows the couplings between the wing 601 and pylon 602 in more detail. It can be seen that, in this particular example, the aft end of the engine mounting pylon 602 is attached to the wing 601 by means of an example joint 6, which may be the same as the example joint 4 of FIGS. 4a-b or the example joint 5 of FIG. 5. The engine mounted on the pylon 602 has been omitted from FIG. 4 so that the pylon 602 can more clearly be seen. FIG. 7 also shows the forward coupling between the pylon 602 and the wing 601. In this particular example, the forward coupling is of the same general design as the forward coupling disclosed in PCT/EP2018/058960. However; this need not be the case for all examples. It can be seen from FIG. 7 that the vertical spacing between the upper surface of the engine mounting pylon 602 and the lower surface of the wing box 601 is very small.

Although the invention has been described above with reference to one or more preferred examples or embodiments, it will be appreciated that various changes or modifications may be made without departing from the scope of the invention as defined in the appended claims. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A joint for connecting a first aircraft structure to a second aircraft structure such that relative rotation and relative translational movement of the first and second aircraft structures along a first axis is permitted, whilst relative translational movement of the first and second aircraft structures along axes orthogonal to the first axis is substantially prevented, the joint comprising:
   a bracket on the first aircraft structure, the bracket having an opening aligned with the first axis;
   a pin aligned with the first axis, a first end of the pin being received within the opening and a second end of the pin being engaged with the second aircraft structure; and
   a convex part-spherical outer bearing surface disposed on the first end of the pin and configured for rotational sliding contact with a concave part-spherical bearing surface disposed in the opening;
   wherein the pin is configured to translate along the first axis relative to at least one of the part-spherical outer bearing surface and the second aircraft structure.

2. The joint according to claim 1, wherein the first axis is substantially aligned with a longitudinal axis of a fuselage of an aircraft, wherein at least one of the first and second aircraft structures is attached to the fuselage.

3. The joint according to claim 2, wherein the primary load reacted by the joint during operation of an aircraft in which the joint is comprised acts along a direction substantially perpendicular to the first axis.

4. The joint according to claim 3, wherein the primary load reacted by the joint during operation of an aircraft in which the joint is comprised acts along the vertical direction.

5. The joint according to claim 1, wherein the axis of the bore is aligned with the first axis.

6. The joint according to claim 1, wherein the pin comprises a secondary pin element nested within a primary pin element, and wherein each of the primary pin element and the secondary pin element is individually able to react the loads expected to be experienced by the pin during operation of an aircraft in which the joint is comprised.

7. The joint according to claim 1, wherein engagement between the convex part-spherical outer bearing surface and the concave part-spherical bearing surface suppresses translational movement of the convex part-spherical outer bearing surface relative to the concave part-spherical bearing surface.

8. The joint according to claim 1, wherein the second end of the pin is engaged with the second aircraft structure by the second end of the pin being received in a recess provided in an outer surface of the second aircraft structure.

9. The joint according to claim 8, wherein the second end of the pin is configured for axial sliding movement relative to the recess.

10. The joint according to claim 1, wherein the convex part-spherical outer bearing surface is comprised in a bearing mounted in the opening, the bearing further comprising an inner bearing surface defining a bore through which the pin extends and being configured for translational sliding contact with the pin.

11. The joint according to claim 10, wherein the joint comprises a biasing mechanism configured to bias the pin toward a predefined axial position relative to the bracket.

12. The joint according to claim 11, wherein the biasing mechanism comprises a diaphragm spring mounted on the bracket.

13. The joint according to claim 9, wherein the convex part-spherical outer bearing surface is fixedly attached to the first end of the pin, such that translation of the pin along the first axis relative to the first aircraft structure is substantially prevented.

14. The joint according to claim 1, wherein the first aircraft structure is an engine mounting pylon and the second structure is a wing box, and wherein the joint is configured to connect the aft end of the engine mounting pylon to the wing box.

15. An aircraft including a first aircraft structure connected to a second aircraft structure by a joint, wherein the joint connects the first aircraft structure to the second aircraft structure such that relative rotation and relative translational movement of the first and second aircraft structures along a first axis is permitted, whilst relative translational movement of the first and second aircraft structures along axes orthogonal to the first axis is substantially prevented, the joint comprising:
   a bracket on the first aircraft structure including an opening aligned with a first axis, wherein relative movement of the first and second aircraft structures occurs the first axis;
   a pin aligned with the first axis, a first end of the pin is received within the opening and a second end of the pin is engaged with the second aircraft structure; and
   a convex part-spherical outer bearing surface disposed on the first end of the pin and configured for rotational sliding contact with a concave part-spherical bearing surface disposed in the opening;
   wherein the pin is configured to translate along the first axis relative to at least one of the convex part-spherical outer bearing surface and the second aircraft structure.

16. The aircraft according to claim 15, wherein the first aircraft structure is an engine mounting pylon and the second aircraft structure is a wing box.

17. The aircraft according to claim 16, wherein the engine mounting pylon and the wing box are close-coupled.

18. The aircraft according to claim 16, further comprising an Ultra High-Bypass Ratio engine mounted on the engine mounting pylon.

* * * * *